(12) United States Patent
Haller

(10) Patent No.: US 9,684,310 B2
(45) Date of Patent: Jun. 20, 2017

(54) COMPENSATED PERFORMANCE OF A SOLENOID VALVE BASED ON ENVIRONMENTAL CONDITIONS AND PRODUCT LIFE

(71) Applicant: Automatic Switch Company, Florham Park, NJ (US)

(72) Inventor: John J. Haller, Boonton, NJ (US)

(73) Assignee: AUTOMATIC SWITCH COMPANY, Florham Park, NJ (US)

(*) Notice: Subject to any disclaimer, the term of this patent is extended or adjusted under 35 U.S.C. 154(b) by 130 days.

(21) Appl. No.: 14/802,143

(22) Filed: Jul. 17, 2015

(65) Prior Publication Data
US 2017/0017243 A1 Jan. 19, 2017

(51) Int. Cl.
*G05D 7/06* (2006.01)
*F16K 31/06* (2006.01)

(52) U.S. Cl.
CPC ....... *G05D 7/0623* (2013.01); *F16K 31/0672* (2013.01); *F16K 31/0675* (2013.01)

(58) Field of Classification Search
CPC .............................. G05D 7/0623; F16K 31/06
USPC .... 137/78.1, 78.5, 80, 81.1, 79; 251/129.09, 251/129.15, 129.17, 129.18
See application file for complete search history.

(56) References Cited

U.S. PATENT DOCUMENTS

| | | | |
|---|---|---|---|
| 3,822,039 A | 7/1974 | Mori | |
| 5,161,083 A | 11/1992 | Mohler et al. | |
| 5,722,632 A | 3/1998 | Rader et al. | |
| 6,637,836 B2 | 10/2003 | Kuragaki et al. | |
| 6,722,347 B2* | 4/2004 | Sanchez | F02D 41/004 123/520 |
| 6,735,069 B2 | 5/2004 | Ehara | |
| 6,873,514 B2 | 3/2005 | Maller et al. | |
| 7,430,102 B2 | 9/2008 | Groh et al. | |
| 7,903,383 B2 | 3/2011 | Fukano et al. | |
| 8,151,823 B2* | 4/2012 | Gehrke | F15B 13/0853 137/487.5 |
| 8,392,077 B1 | 3/2013 | Kanzaki et al. | |
| 8,681,468 B2 | 3/2014 | Jacob et al. | |
| 2003/0165039 A1 | 9/2003 | Moran | |

(Continued)

FOREIGN PATENT DOCUMENTS

CA 2221667 5/1999
GB 888490 1/1962

(Continued)

OTHER PUBLICATIONS

PCT Search Report for PCT Application No. PCT/US2016/042114 dated Sep. 12, 2016.

(Continued)

*Primary Examiner* — Michael R Reid
*Assistant Examiner* — Patrick Williams
(74) *Attorney, Agent, or Firm* — Locke Lord LLP

(57) ABSTRACT

The present disclosure provides a solenoid valve and associated method of control for compensated performance based on environmental conditions and optionally product life. The solenoid coil power consumption is proactively optimized based on predetermined database information to cross reference a given operating temperature and optionally, valve operating cycles. The net effect is to reduce power consumption under normal conditions and selectively apply higher power to the valve coil when required.

9 Claims, 1 Drawing Sheet

(56) References Cited

U.S. PATENT DOCUMENTS

| | | | |
|---|---|---|---|
| 2011/0076161 A1 | 3/2011 | Taguchi | |
| 2012/0232704 A1* | 9/2012 | Novak | B66C 13/40 |
| | | | 700/282 |
| 2013/0327969 A1* | 12/2013 | Hutchins | F16K 31/0655 |
| | | | 251/129.15 |
| 2014/0222313 A1 | 8/2014 | Keller et al. | |
| 2014/0261717 A1 | 9/2014 | Egley et al. | |

FOREIGN PATENT DOCUMENTS

| | | |
|---|---|---|
| GB | 2152708 | 8/1985 |
| WO | 2015017747 | 2/2015 |

OTHER PUBLICATIONS

PCT Written Opinion for PCT Application No. PCT/US2016/042114 dated Sep. 12, 2016.

\* cited by examiner

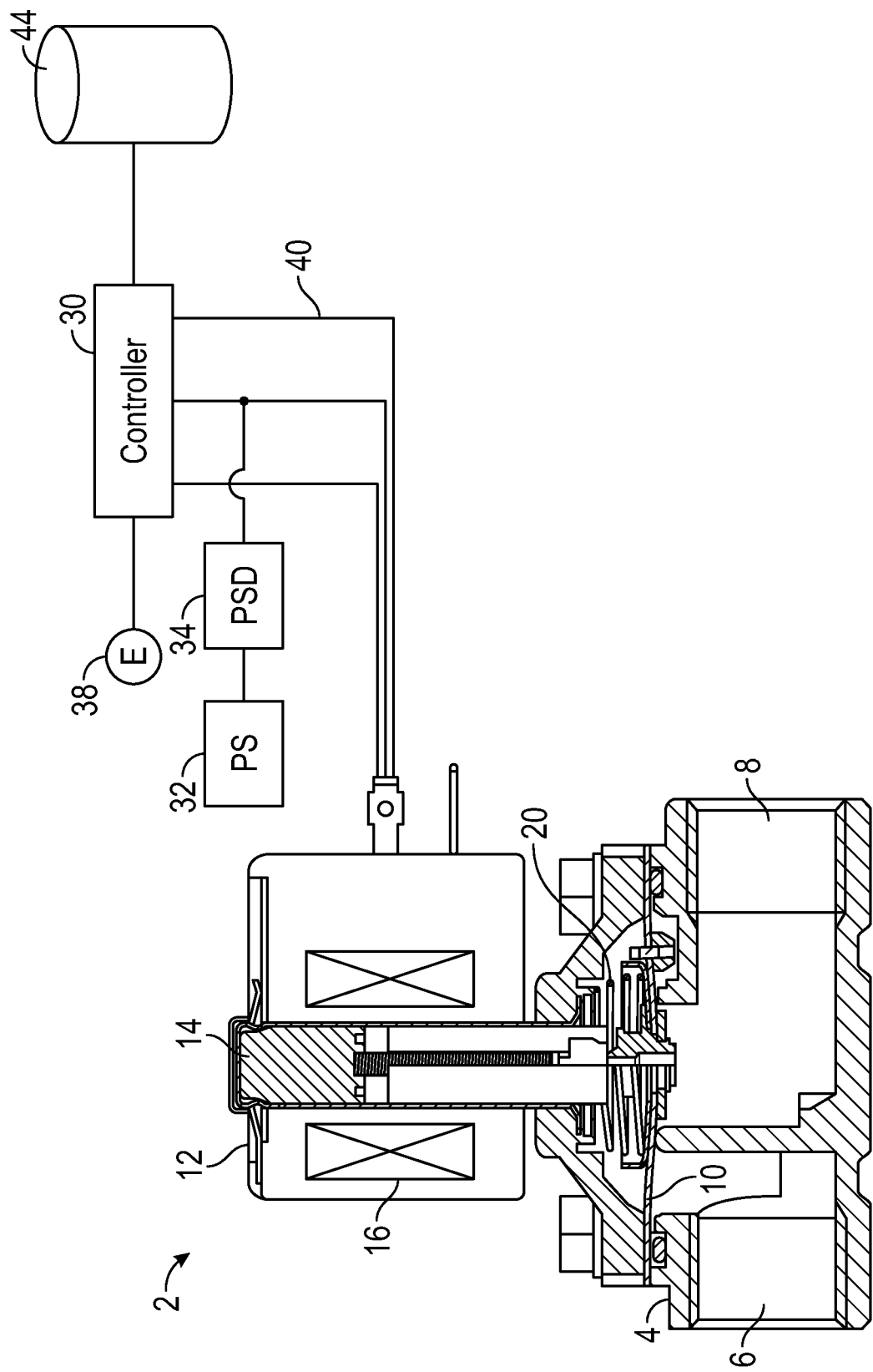

COMPENSATED PERFORMANCE OF A SOLENOID VALVE BASED ON ENVIRONMENTAL CONDITIONS AND PRODUCT LIFE

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure generally relates to valves. Specifically, the disclosure relates to solenoid operated valves.

Description of the Related Art

In many solenoid valve applications, especially industrial and commercial applications, a solenoid valve is required to operate over a wide range of temperatures. The mechanical performance of the valve can be affected significantly, for example, by low temperature operation that increases the amount of power required to operate the valve due to changes in the properties of mechanical components. Additionally, as a valve proceeds through its life cycle, the properties of many of the mechanical components age, causing the required mechanical force to increase and more electrical coil power to operate. In the design of such a valve, one skilled in the art generally would make an evaluation of the worst case conditions and then design the winding of the coil to a power level to accommodate the worst case. This of course will lead to a power consumption of the device that will be excessive as compared to the more normal conditions of operation.

Various known patents and applications describe measuring and affecting solenoid coil responses are known. For example, Canadian Publ. No. 2221667 teaches a proportional valve where different currents result in different positions of the internal valve spool. CA '667 seeks to more precisely maintain the position of the valve spool by sensing the temperature in an oil inlet of the valve and indirectly the temperature of the coil which affects the coils' resistance. A controller adjusts the voltage to the coil based on the variance in resistance, so that a constant current through the coil is achieved to keep a constant force on the valve spool. U.S. Pat. No. 8,681,468 teaches a method of a solenoid valve control that discloses measuring voltage across the solenoid valve coil and current through the solenoid valve coil to control the valve, such as when actual engagement of the solenoid valve occurs. US '468 teaches a reactive system that measures and monitors the current and voltage on an ongoing basis and makes adjustments based on performance of the valve, such as the timing, to lessen overpowering of the valve. US Publication No. 2014/0222313A1 teaches a method of energizing a solenoid valve of a hydraulic control system according to a predetermined timing schedule to move a valve member of the solenoid valve connected to a switching component to deliver pressurized fluid when the valve member moves to switch a switching component. An operating parameter is measured and may be a period of time over which the valve member moves, or a sensed operating parameter of the fluid, such as pressure or temperature. The measured parameter is then compared with a predetermined parameter, and energizing of the solenoid valve is then adjusted based on the difference.

However, these patents and applications apparently disclose systems and method that have not been generally implemented in the industry, possibly due to complexity, longevity, and costs. In many instances, especially for solenoids operating directional control valves that are switching on and off and not proportionally controlled to variable positions, the control systems monitor changes in resistance from the operational heating of the coil and adjust the voltage or duty cycle to generate a constant current for the solenoid valve to actuate with the assumption that the same current will produce the same results in actuation.

There remains a need for a control system for a solenoid valve under various environmental operating conditions independent of a need for constant monitoring of the solenoid valve that is simple and inexpensive, and can be widely adapted in the field.

BRIEF SUMMARY OF THE INVENTION

The present disclosure provides a solenoid valve and associated method of control for compensated performance based on environmental conditions and optionally product life. The solenoid coil power consumption is proactively optimized based on predetermined database information to cross reference a given operating temperature and optionally, valve operating cycles. The net effect is to reduce power consumption under normal conditions and selectively apply higher power to the valve coil when required.

The disclosure provides a system for a solenoid operated valve, comprising: a valve having an inlet and an outlet; a solenoid coupled with the valve having a coil; a controller coupled with the solenoid; an environmental sensor coupled with the controller; a power source coupled to the controller; and a database of predetermined adjustments in power to the solenoid depending on environmental conditions; wherein the controller is configured to adjust power to the solenoid based on input from the environmental sensor by an amount determined by accessing the database.

The disclosure provides a method of controlling a solenoid operated valve having an inlet and an outlet; a solenoid coupled with the valve having a coil; a controller coupled with the solenoid; an environmental sensor coupled with the controller; a power source coupled to the controller; and a database of predetermined adjustments in power to the solenoid depending on environmental conditions, the method comprising: sensing an environmental condition with the environmental sensor; accessing the database with the environmental condition; determining with the controller whether a power adjustment is to be made based on the database information for the environmental condition; and adjusting the power to the solenoid if the database indicates an adjustment is to be made based on the environmental condition.

BRIEF DESCRIPTION OF THE SEVERAL VIEWS OF THE DRAWINGS

FIG. 1 is schematic view of a solenoid operated valve (SOV) with a controller according to the invention.

DETAILED DESCRIPTION

The Figures described above and the written description of specific structures and functions below are not presented to limit the scope of what Applicant has invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims. Where appropriate, one or more elements may have been labeled with an "A" or "B" to designate various members of a given class of an element. When referring generally to such elements, the number without the letter can be used. Further, such designations do not limit the number of members that can be used for that function. Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the word "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unity fashion. The coupling may occur in any direction, including rotationally.

The present disclosure provides a solenoid valve and associated method of control for compensated performance based on environmental conditions and optionally product life. The solenoid coil power consumption is proactively optimized based on predetermined database information to cross reference a given operating temperature and optionally, valve operating cycles. The net effect is to reduce power consumption under normal conditions and selectively apply higher power to the valve coil when required.

FIG. 1 is schematic view of a solenoid operated valve (SOV) with a controller according to the invention. An SOV 2 includes a valve 4 having at least one inlet 6 and at least one outlet 8. Flow through the exemplary valve is controlled by a diaphragm 10 that can open and close over a flow passageway. Other methods of flow control known in the art can be used. A solenoid 12 can be mounted to the valve 4 and generally includes armature 14 surrounded by a coil 16. The coil 16 when powered moves a plunger 18 generally upward in the orientation shown to move the diaphragm 10. A spring 20 generally returns the plunger to a rest position when the coil is not powered.

A controller 30, such as a microcontroller or other suitable processor, is coupled to the solenoid 12. A power supply 32 is coupled to a power switching device 34 that is controlled by the controller 30 to deliver power through power lines 36 to the coil 16. In some embodiments, the power supply 32 and power switching device 34 can be an integral unit. An environmental sensor 38 is also coupled to the controller 30. The environmental sensor 30 can sense one or more of a variety of environmental conditions, such as the ambient temperature, pressure of fluid in the valve 4, and other indirect conditions that might affect the valve performance. A database 44 is coupled to the controller 30. The database 44 can contain predetermined adjustment criteria based on the readings of the environment sensor and/or other predetermined criteria In operation, the controller 30 and associated control circuitry provides power through a controlled power switching device which is connected to the SOV coil and receives inputs for ambient temperature, line pressure, and/or other conditions. The database 44 can include a table of values that provide information on the required coil current based on temperature or other predetermined environmental conditions and proactively adjust the power such as by adjusting the current based on such environmental condition(s). The term "power" is used broadly and can include adjustments to current or voltage (or even resistance by a variable resistance) or any combination thereof to compensate for the change in environmental condition by the predetermined data. Advantageously, the adjustments can be made independently of a monitored input received from the valve in contrast to prior efforts. Such prior efforts may adjust current or voltage based on a measured change in resistance or timing of engagement or applied force. In the invention, while the coil current may be periodically measured, the decision is how much to adjust the power to the level indicated by the predetermined amount for the particular environmental condition. For example, if data stored in the database indicates the valve requires 15% more operating current function in a −40° C. environment, then the controller can adjust the current proactively without having to measure the resistance changes or other changes in the coil due to ambient temperature. Other environmental conditions can be measured and adjustments made based on predetermined factors and data without requiring direct measurement from the solenoid or valve. Thus, the invention can accomplish an adjustment to the current with far more simplicity and less cost prior efforts.

Optionally and as a further adjustment, the system can receive input on the number of cycles of valve operation. The controller 30 can be programmed to count the number of cycles the SOV has been operated to determine where the valve is in its life cycle. An input line 40 provides information from the solenoid 12 to the controller 30, including such information as the number of cycles of operation, duration of cycles, and other operational information. The database 44 can contain further predetermined adjustment criteria based on the valve cycles. When the valve reaches some predetermined amount, for example, 100,000 cycles, the controller 30 can adjust the power higher by a predetermined amount to compensate for increased friction caused by wear of moving parts based on data stored in the database.

Advantageously, the invention differs from known prior efforts by simplifying the operation. The invention does not need to adjust for coil resistance changes, precise valve positioning, the amount of force, or even timing of the valve. In such cases, most prior efforts need real time measurements to reactively compensate for changes in the solenoid performance. In contrast, the invention can compensate for macro-scale changes with simple measurements and predetermined database information to provide sufficient accuracy for the operation of the SOV. In many instances, it is envisioned that the invention will apply to direct control valves that are operated in on/off positions, rather than proportional positions.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The invention has been described in the context of preferred and other embodiments and not every embodiment of the invention has been described. For example, other sizes could be similarly designed with the resulting differences in flow volumes described above. Obvious modifications and alterations to the described embodiments are available to those with ordinary skill in the art given the teachings disclosed herein. In conformity with the patent laws, the claims determine the scope or range of equivalents, rather than the disclosed exemplary embodiments, with the understanding that other embodiments within the scope of such claims exist.

What is claimed is:

1. A system for a solenoid operated valve, comprising:
   a valve having an inlet and an outlet;
   a solenoid coupled with the valve and having a coil;
   a controller coupled with the solenoid;
   an environmental sensor coupled with the controller;
   a power source coupled to the controller; and
   a database of predetermined adjustments in power to the solenoid depending on environmental conditions;
   wherein the controller is configured to adjust power to the solenoid by one of the predetermined adjustments in power in the database based on input from the environmental sensor; and
   wherein the controller is further configured to count a number of operational cycles of the solenoid and the database contains predetermined adjustments in power to the solenoid depending on the number of operational cycles of the solenoid.

2. The system of claim 1, wherein the controller is configured to adjust power independent of a monitored input received from the valve.

3. The system of claim 1, further comprising an input line from the solenoid to the controller.

4. The system of claim 1, wherein the environmental sensor senses ambient temperature of the valve.

5. The system of claim 1, wherein the environmental sensor senses fluid pressure in the valve.

6. A method of controlling a solenoid operated valve having an inlet and an outlet; a solenoid coupled with the valve and having a coil; a controller coupled with the solenoid; an environmental sensor coupled with the controller; a power source coupled to the controller; and a database of predetermined adjustments in power to the solenoid depending on environmental conditions, the method comprising:
   sensing an environmental condition with the environmental sensor;
   accessing the database with the environmental condition;
   determining with the controller whether a power adjustment is to be made based on information in the database for the environmental condition;
   adjusting the power to the solenoid if the database indicates an adjustment is to be made based on the environmental condition;
   counting a number of operational cycles of the solenoid;
   accessing the database with the number of cycles
   determining with the controller whether a power adjustment is to be made based on information in the database for the number of cycles; and
   adjusting the power to the solenoid if the database indicates an adjustment is to be made based on the number of cycles.

7. The system of claim 6, wherein adjusting the power to the solenoid occurs independent of a monitored input received from the valve.

8. The method of claim 6, wherein sensing the environmental condition comprises sensing an ambient temperature of the valve.

9. The method of claim 6, wherein sensing the environmental condition comprises sensing fluid pressure in the valve.

* * * * *